US012592002B2

(12) United States Patent
Sakatani

(10) Patent No.: US 12,592,002 B2
(45) Date of Patent: Mar. 31, 2026

(54) COLOR CONVERSION SYSTEM, COLOR CONVERSION METHOD, AND INFORMATION PROCESSING APPARATUS

(71) Applicant: KONICA MINOLTA, INC., Tokyo (JP)

(72) Inventor: Kazuomi Sakatani, Machida (JP)

(73) Assignee: KONICA MINOLTA, INC., Tokyo (JP)

( * ) Notice: Subject to any disclaimer, the term of this patent is extended or adjusted under 35 U.S.C. 154(b) by 321 days.

(21) Appl. No.: 18/219,509

(22) Filed: Jul. 7, 2023

(65) Prior Publication Data

US 2024/0070919 A1    Feb. 29, 2024

(30) Foreign Application Priority Data

Aug. 24, 2022    (JP) ................................. 2022-133090

(51) Int. Cl.
| | |
|---|---|
| *G06T 7/90* | (2017.01) |
| *G06T 5/00* | (2024.01) |
| *G06T 5/50* | (2006.01) |
| *G06T 5/70* | (2024.01) |
| *G06T 7/11* | (2017.01) |
| *H04N 1/60* | (2006.01) |

(52) U.S. Cl.
CPC ................. *G06T 7/90* (2017.01); *G06T 5/50* (2013.01); *G06T 5/70* (2024.01); *G06T 7/11* (2017.01); *H04N 1/6033* (2013.01); *G06T 2207/10024* (2013.01)

(58) Field of Classification Search
CPC ..... G06T 7/90; G06T 7/11; G06T 5/70; G06T 5/50; G06T 2207/10024
See application file for complete search history.

(56) References Cited

U.S. PATENT DOCUMENTS

| | | | |
|---|---|---|---|
| 2016/0156810 A1* | 6/2016 | Nakamura | ......... H04N 1/00015 |
| | | | 358/1.9 |
| 2020/0053301 A1* | 2/2020 | Yahata | ..................... G06T 5/70 |

FOREIGN PATENT DOCUMENTS

| | | |
|---|---|---|
| JP | 2001004448 A | 1/2001 |
| JP | 2018081244 A | 5/2018 |

OTHER PUBLICATIONS

NPL: 2005-2024.*
NPL: Results Publication Date Range: Mar. 15, 2002 to Sep. 11, 2025.*

* cited by examiner

*Primary Examiner* — Quang N Vo
(74) *Attorney, Agent, or Firm* — Holtz, Holtz & Volek PC

(57) ABSTRACT

A color conversion system includes: an image reader that reads a test sheet on which a plurality of patches is formed and outputs a read image; and a hardware processor that analyzes a region of interest for each of the patches of the read image according to an operation mode for a color conversion table in which a read pixel value and a pixel value in a color space are associated with each other for each of the patches of the read image, and performs image noise removal processing, and performs color conversion of converting the read pixel value corresponding to the region of interest of the patch into a pixel value in the color space using the color conversion table in a case where the operation mode is a use mode.

12 Claims, 6 Drawing Sheets

CONVEYANCE DIRECTION
(SUB-SCANNING DIRECTION)

MAIN SCANNING
DIRECTION

COLOR CONVERSION SYSTEM, COLOR CONVERSION METHOD, AND INFORMATION PROCESSING APPARATUS

The entire disclosure of Japanese patent Application No. 2022-133090, filed on Aug. 24, 2022, is incorporated herein by reference in its entirety.

BACKGROUND

Technological Field

The present invention relates to a color conversion system, a color conversion method, and an information processing apparatus.

Description of the Related Art

Conventionally, in image adjustment related to color, it is common to perform colorimetry using a colorimeter. Meanwhile, in an image forming apparatus, in particular, in a one-pass inkjet printer, a streak-like image noise parallel to a sheet conveyance direction may occur. When a portion where a streak-like image noise is generated on a colorimetric patch is color mimetically measured by a colorimeter, the portion is affected by the streak. This influence is difficult to remove by means such as image processing.

Furthermore, since it took several tens of minutes for the colorimetric processing using the colorimeter, always performing colorimetry using the colorimeter tends to lead to a decrease in work efficiency. On the other hand, since the time required for the colorimetric processing by a scanner is shorter than the colorimetric processing using the colorimeter, it has been desired to use the scanner for the colorimetric processing. Therefore, a technique using a scanner as a colorimeter (See JP 2001-004448 A.) has been proposed. In a case where the scanner is used as a colorimeter, it is necessary to create a color conversion table for converting scanner RGB values into a Lab color space of the colorimeter. When the color conversion table is created, in a case where there is image noise such as a streak on the patch, there is a problem that the accuracy of the color conversion table is deteriorated. Therefore, a technique for performing image noise removal processing at the time of creating the color conversion table (See JP 2018-081244 A.) has been proposed.

In the technique described in JP 2001-004448 A, an image input scanner is used as a color data input unit for colorimetry, data obtained by arithmetically averaging image data of a predetermined region is used as scanner measurement data, and the arithmetically averaged data enables a fractional portion. A conversion unit for matching the scanner measurement data with standard colorimeter data described in JP 2001-004448 A converts the scanner measurement data into the standard colorimeter data with a conversion profile.

The technique described in JP 2018-081244 A describes a calibration unit that acquires a measurement value of a color of each patch from image data generated by an image reader, and performs calibration of an image formed by an image forming unit according to the acquired measurement value. The calibration unit extracts an image area of each patch from the image data generated by the image reader, averages pixel values of pixels arranged in one direction of a main scanning direction or a sub-scanning direction in the extracted image area of each patch to create profile data, performs noise removal processing on the profile data, averages pixel values less than or equal to a threshold value among the pixel values of the profile data after the noise removal processing, and outputs the average value as a measurement value of a color of each patch.

As described above, conventionally, a technique using a seamier as a colorimeter (JP 2001-004448 A) has been proposed. However, in the technique described in JP 2001-004448 A, in a case where there is image noise such as a streak on a patch, when a color is estimated using a created color conversion table, a deviation between an RGB value of a scanned image of the patch having image noise such as a streak and an original RGB value is large, and thus, there is a problem that accuracy of color estimation is deteriorated. Furthermore, a technique of performing image noise removal processing at the time of creating a color conversion table (JP 2018-081244 A) has also been proposed. However, when the image noise removal processing is performed at the time of creating the color conversion table, a deviation between a scanner RGB value and a colorimetric value increases, and the accuracy of the color conversion table deteriorates.

SUMMARY

The present invention has been made to solve the above problems, and an object of the present invention is to reduce an influence of image noise and perform colorimetry with high accuracy in colorimetric processing using a scanner.

To achieve the abovementioned object, according to an aspect of the present invention, a color conversion system reflecting one aspect of the present invention comprises: an image reader that reads a test sheet on which a plurality of patches is formed and outputs a read image; and a hardware processor that analyzes a region of interest for each of the patches of the read image according to an operation mode for a color conversion table in which a read pixel value and a pixel value in a color space are associated with each other for each of the patches of the read image, and performs image noise removal processing, and performs color conversion of converting the read pixel value corresponding to the region of interest of the patch into a pixel value in the color space using the color conversion table in a case where the operation mode is a use mode.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIGS. 4A to 4D are diagrams for explaining patch analysis processing at the time of creation in a creation mode of a color conversion table in the color conversion system according to the embodiment of the present invention;

DETAILED DESCRIPTION OF EMBODIMENTS

Hereinafter, one or more embodiments of the present invention will be described with reference to the drawings. However, the scope of the invention is not limited to the disclosed embodiments. In the present specification and the drawings, components having substantially the same function or configuration are denoted by the same reference signs, and redundant description is omitted.

Embodiment

[Schematic Configuration of Color Conversion System]

Figure 1:
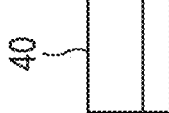
FIG. 1 is a diagram illustrating a schematic configuration of a color conversion system according to an embodiment of the present invention.

First, a schematic configuration of a color conversion system 1 according to the present embodiment will be described. FIG. 1 is a diagram illustrating a schematic configuration of the color conversion system 1 according to the present embodiment. As illustrated in FIG. 1, the color conversion system 1 includes a sheet feeding device 10, a printer 20, a sheet ejection device 30, and a colorimeter 40. The sheet feeding device 10, the printer 20, and the sheet ejection device 30 are connected and disposed in this order from an upstream side to a downstream side in a conveyance direction of a recording medium.

The sheet feeding device 10 (an example of a recording medium supply device) includes a container (sheet feeding tray) that contains a recording medium, and supplies the recording medium to the printer 20. Note that, in the present embodiment, a printing sheet, a cell, a film, a fabric, or the like can be used as a recording medium on winch an image is formed. Furthermore, supplying the recording medium to the printer 20 is referred to as "sheet feeding".

The printer 20 is configured by, for example, a one-pass UV inkjet printer, and includes a main cylinder 21, a plurality of head units 22, an irradiation unit 23, a scanner 24, and an information processing unit 25 as illustrated in FIG. 1. Note that the printer 20 is not limited to the one-pass UV inkjet printer, and may be, for example, an image forming apparatus that forms an image on a recording medium by an electrophotographic method other than the one-pass UV inkjet printer.

The main cylinder 21 is formed of a cylindrical member, and is rotated counterclockwise in the drawing by a drive motor (not illustrated). The main cylinder 21 holds the recording medium along a cylindrical outer peripheral surface, and conveys the recording medium along with the rotation thereof. A conveying surface of the main cylinder 21 faces the plurality of head units 22, the irradiation unit 23, and the scanner 24, and the head units 22 and the irradiation unit 23 perform processing related to image formation on the recording medium conveyed by the main cylinder 21. The scanner 24 scans the recording medium on which the image is formed and reads the image (print image) formed on the recording medium.

The plurality of head units 22 form an image by ejecting ink droplets to a recording surface of the recording medium moving according to the rotation of the main cylinder 21 at an appropriate timing, and causing the ink droplets to land on the recording target surface of the recording medium. The plurality of head units 22 can include, for example, four head units 22 that respectively eject inks of four colors. 1*n* this case, the four head units 22 include, for example, head units that respectively discharge Y (yellow), M (magenta), C (cyan), and K (black) inks.

The irradiation unit 23 includes, for example, a fluorescent tube such as a low-pressure mercury lamp, and causes the fluorescent tube to emit light to emit energy rays such as ultraviolet rays. The irradiation unit 23 is provided near the outer peripheral surface of the main cylinder 21 and at a position on the downstream side of the head unit 22 in the conveyance direction of the recording medium. Furthermore, the irradiation unit 23 irradiates the recording medium held by the main cylinder 21 and onto which the ink has been discharged with energy rays to cure the ink.

The scanner 24 is an example of an image reader including an image sensor or the like, reads a recording medium on which an image is formed, for example, a test sheet for colorimetry on which a plurality of patches is formed, and outputs a read image to the information processing unit 25. Note that although FIG. 1 illustrates an example in which the scanner 24 is configured inside the printer 20, the scanner 24 may be configured outside the printer 20.

The information processing unit 25 includes a central processing unit (CPU) 25*a*, a read only memory (ROM) 25*b*, a random access memory (RAM) 25*c*, and a storage device 25*d*. The information processing unit 25 includes, for example, a microprocessor or the like, and performs overall control of the printer 20. Note that, although FIG. 1 illustrates an example in which the information processing unit 25 is configured inside the printer 20, the information processing unit 25 may be configured in a personal computer (PC) provided outside the printer 20 and capable of communicating with the printer 20.

The CPU 25*a* controls an operation of the information processing unit 25. The CPU 25*a* controls, for example, operations of the main cylinder 21, the head units 22, and the irradiation unit 23 to control image forming processing in the printer 20. Furthermore, the CPU 25*a* controls reading processing on a recording medium on which an image is formed in the scanner 24. Furthermore, the CPU 25*a* controls colorimetric processing (see FIG. 6 described later) in the information processing unit 25.

The ROM 25*b* includes, for example, a storage medium such as a nonvolatile memory, and stores programs, data, and the like executed and referred to by the CPU 25*a*. The ROM 25*b* is used as an example of a computer-readable non-transitory storage medium storing the program to be executed by the information processing unit 25.

The RAM 25*c* includes, for example, a storage medium such as a volatile memory, and temporarily stores information (data) necessary for processing performed by the CPU 25*a*.

The storage device 25*d* is constituted by a computer-readable non-transitory recording medium storing the program to be executed by the CPU 25*a*, and is constituted by a storage device such as a hard disk drive (HDD). The storage device stores a program for the CPU 25*a* to control each unit, an operating system (OS), a program such as a controller, and data. Note that, a part of the program and data stored in the storage device may be stored in the ROM 25*b*. Furthermore, the computer-readable non-transitory recording medium storing the program executed by the CPU 25*a* is not limited to the HDD, and may be a recording medium such as a solid state drive (SSD), a compact disc (CD)-ROM, or a digital versatile disc (DVD)-ROM.

The sheet ejection device 30 includes a container (sheet ejection tray) that contains a recording medium, and stores the recording medium ejected from the printer 20, on which an image is formed.

The colorimeter 40 includes, for example, a spectral colorimeter capable of simultaneously measuring color and gloss, and measures a colorimetric value of the test sheet as a pixel value in a color space. Furthermore, the colorimeter 40 outputs the measured colorimetric value of the test sheet, that is, each pixel value in the Lab color space to the information processing unit 25 of the printer 20 via a universal serial bus (USB) connection port, a local area network (LAN), or the like. Here, it is assumed that the colorimeter 40 has a circular aperture having a diameter of about 3 mm. When the colorimeter 40 is used, the test sheet is cut into a size that allows the test sheet to pass through the aperture of the colorimeter 40 and subjected to colorimetry. Note that a measurement diameter of the colorimeter 40 is smaller than a diameter of the aperture, and the size that allows the sheet to pass through the aperture is a size that allows the aperture to be disposed on a central portion of the patch on the test sheet. Furthermore, in a case where the colorimeter 40 is an automatic sheet feeding type, substantially the center of the patch is automatically colorimetrically measured. A colorimeter 40 that does not require cutting of a test sheet may be used.

[Functional Configuration of Information Processing Unit]

Figure 2:
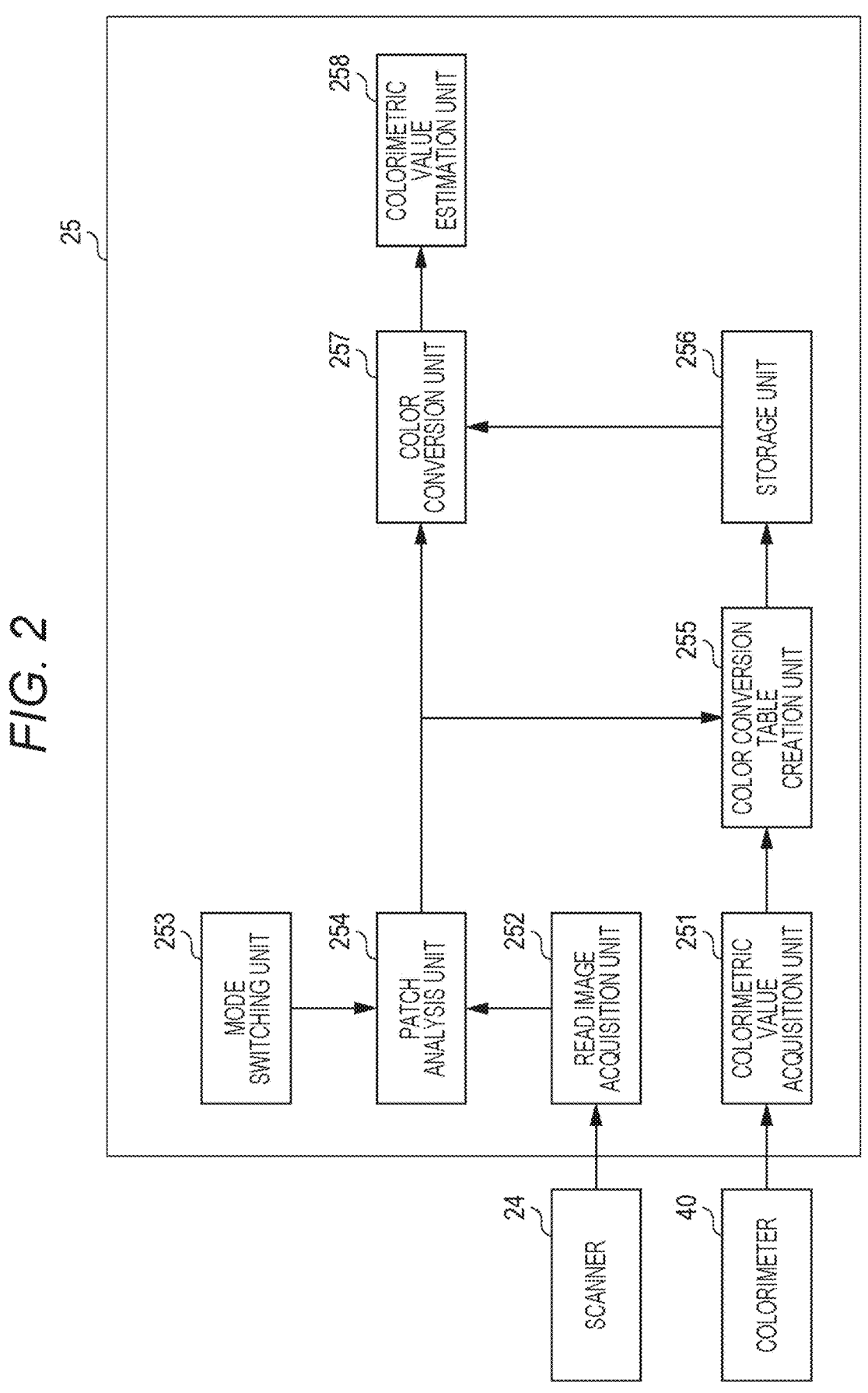
FIG. 2 is a block diagram illustrating a functional configuration of an information processing unit of the color conversion system according to the embodiment of the present invention.

Next, a functional configuration of the information processing unit 25 of the color conversion system 1 according to the present embodiment will be described. FIG. 2 is a block diagram illustrating a functional configuration of the information processing unit 25 of the color conversion system 1 according to the present embodiment. As illustrated in FIG. 2, the information processing unit 25 includes a colorimetric value acquisition unit 251, a read image acquisition unit 252, a mode switching unit 253, a patch analysis unit 254, a color conversion table creation unit 255, a storage unit 256, a color conversion unit 257, and a colorimetric value estimation unit 258.

The mode switching unit 253 is connected to the patch analysis unit 254. The read image acquisition unit 252, the patch analysis unit 254, the color conversion unit 257, and the colorimetric value estimation unit 258 are connected in this order. The colorimetric value acquisition unit 251, the color conversion table creation unit 255, and the storage unit 256 are connected in this order. Furthermore, the patch analysis unit 254 is also connected to the color conversion table creation unit 255, and the color conversion unit 257 is also connected to the storage unit 256. Furthermore, the colorimetric value acquisition unit 251 is also connected to the colorimeter 40 outside the information processing unit 25 via a USB connection port, a LAN, or the like, and the read image acquisition unit 252 is also connected to the scanner 24 outside the information processing unit 25.

The colorimetric value acquisition unit 251 acquires a colorimetric value of the test sheet colorimetrically measured by the colorimeter 40, and outputs the colorimetric value to the color conversion table creation unit 255.

The read image acquisition unit 252 acquires a read image of a test sheet including a plurality of patches from the scanner 24 and outputs the read image to the patch analysis unit 254.

The mode switching unit 25:3 performs switching between a creation mode and a use mode, which are operation modes for a color conversion table in which a read pixel value (RGB value) and a pixel value in a color space are associated with each other for each patch of the read image of the test sheet. Note that switching between the creation mode and the use mode of the color conversion table is operated in accordance with an instruction input by a user.

The patch analysis unit 254 analyzes a region of interest (ROI) for each patch of the read image of the test sheet according to the operation mode for the color conversion table instructed by the mode switching unit 253, and performs image noise removal processing. Specifically, in a case where the operation mode for the color conversion table is the creation mode, the patch analysis unit 254 performs analysis processing of the region of interest at the time of creation on the read image of each patch included in the test sheet. On the other hand, in a case where the operation mode for the color conversion table is the use mode, the patch analysis unit 254 performs the analysis processing of the region of interest at the time of use on the read image of each patch included in the test sheet. Note that the patch analysis processing at the time of creation and the patch analysis processing at the time of use will be described with reference to FIGS. 4A to 4D and FIGS. 5A and 5B described later, respectively. Furthermore, the test sheets used in the creation mode and the use mode of the color conversion table may be the same or different. Hereinafter, an example in which the same test sheet is used in the creation mode and the use mode of the color conversion table will be described.

Furthermore, the patch analysis unit 254 performs image noise removal processing on the read image of each patch included in the test sheet. The image noise removal processing is processing of removing image noise including streaks, dirt, chips, and the like included in the read image of each patch. As the image noise removal processing, any method can be applied as long as the method can remove the image noise, including, for example, a median filter used to remove the image noise from an image, morphology processing used to remove isolated points and connect and fill discontinuous points, and upper and lower point deletion processing of deleting upper and lower pixels exceeding a predetermined range in order to more approximate to an average value of pixel values.

In a case where the operation mode for the color conversion table is the creation mode, the patch analysis unit 254 disables the image noise removal processing and outputs an RGB value of the region of interest at the time of creation of each patch included in the test sheet to the color conversion table creation unit 255. In a case where the operation mode for the color conversion table is the use mode, the patch analysis unit 254 enables the image noise removal processing and outputs an RGB value of the region of interest at the time of use of each patch included in the test sheet from which the image noise has been removed to the color conversion unit 257.

In a case where the operation mode for the color conversion table is the creation mode, the color conversion table creation unit 255 creates a color conversion table based on the read pixel value (RGB value) of the region of interest of the patch analyzed by the patch analysis unit 254 and the colorimetric values of the patch measured from the test sheet by the colorimeter 40. Specifically, the color conversion table creation unit 255 acquires the colorimetric value of each patch included in the test sheet from the colorimetric value acquisition unit 251, and acquires the RGB value of the region of interest at the time of creation of each patch included in the test sheet from the patch analysis unit 254. Furthermore, the color conversion table creation unit 255 creates a color conversion table on the basis of the RGB value of the region of interest at the time of creation of each patch included in the test sheet and the colorimetric value of each patch measured by the colorimeter 40, and outputs the created color conversion table to the storage unit 256.

The storage unit 256 stores the color conversion table created by the color conversion table creation unit 255.

In a case where the operation mode for the color conversion table is the creation mode, the color conversion unit 257 uses the color conversion table to perform color conversion for converting the read pixel value (RGB value) corresponding to the region of interest of the patch into a pixel value in the color space. Specifically, the color conversion unit 257 acquires the RGB value of the region of interest at the time of use of each patch included in the test sheet from the patch analysis unit 254, and acquires the color conversion table from the storage unit 256. Furthermore, the color conversion unit 257 converts the RGB value of the region of interest at the time of use of each patch included in the test sheet into a pixel value in the Lab color space according to the color conversion table. Furthermore, the color conversion unit 257 outputs, to the colorimetric value estimation unit 258, the pixel value in the Lab color space for the region of interest at the time of use of each color-converted patch included in the test sheet.

The colorimetric value estimation unit 258 estimates a colorimetric value using the pixel value in the color space of the patch color-converted by the color conversion unit 257. Specifically, the colorimetric value estimation unit 258 acquires the pixel value in the Lab color space of the region of interest at the time of use of each patch converted by the color conversion unit 257. Furthermore, the colorimetric value estimation unit 258 averages pixel values included in the region of interest at the time of use for each patch, and estimates the average value as a colorimetric value of each patch.

[Patch Analysis Processing]

Figure 3:
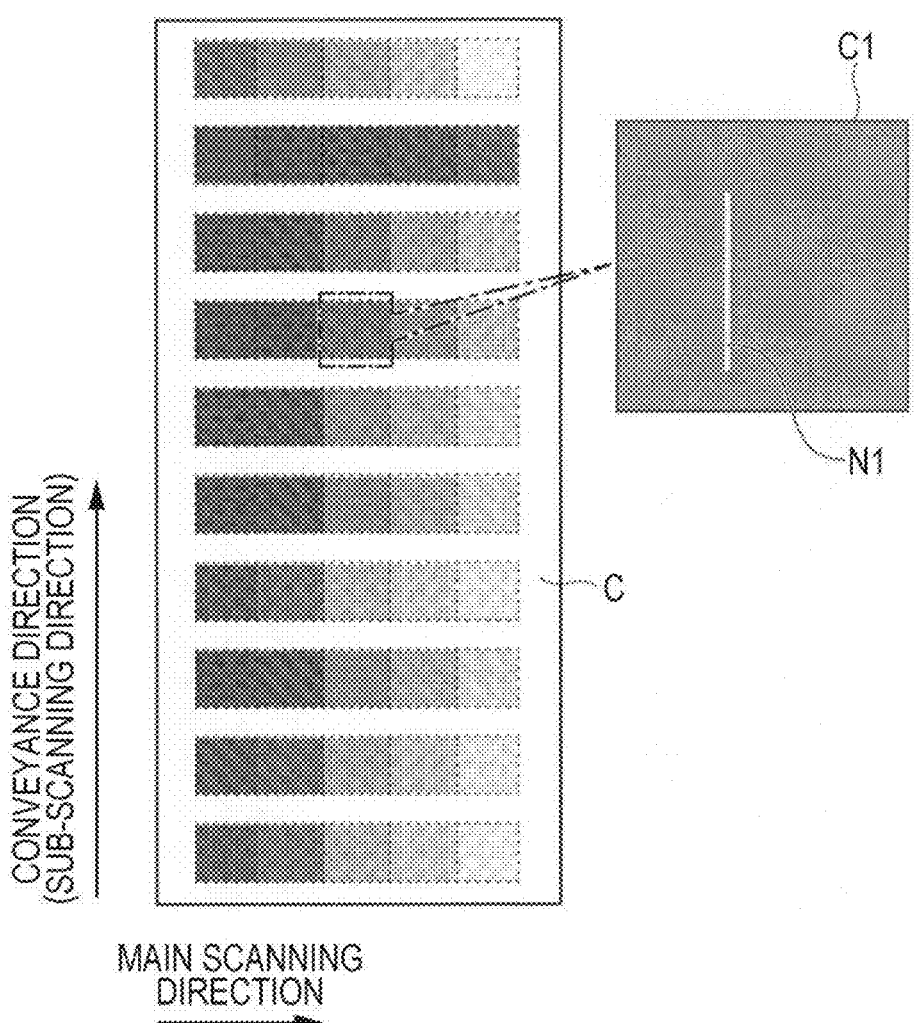
FIG. 3 is a diagram illustrating an example of a test sheet used in the color conversion system according to the embodiment of the present invention.

Next, patch analysis processing in the patch analysis unit 254 of the information processing unit 25 will be described. FIG. 3 is a diagram illustrating an example of a test sheet used in the color conversion system 1 according to the present embodiment. Here, it is assumed that the patch analysis unit 254 performs patch analysis processing on each patch included in a test sheet C illustrated in FIG. 3.

In FIG. 3, a direction from a bottom to a top of the test sheet C is defined as a conveyance direction of a, recording medium, that is, a sub-scanning direction. Furthermore, a direction from a left to a right of the test sheet C, that is, a direction intersecting the conveyance direction (sub-scanning direction) of the recording medium is defined as a main scanning direction. As illustrated in FIG. 3, each patch (a plurality of cells on the test sheet C) included in the test sheet C corresponds to each of a plurality of representative colors to be selected. That is, the number of patches included in the test sheet C is the same as the number of representative colors to be selected. The color included in the test sheet C is 50 colors, but usually, about 1000 colors are included in the test sheet for colorimetry in some cases. Note that, in the following description, a patch C1 included in the test sheet C will be described as an example, and processing for the other patches is similar to that of the patch C1, and thus redundant description will be omitted. As illustrated in FIG. 3, a streak N1 (an example of image noise) parallel to the sub-scanning direction exists in the patch C1.

First, the patch analysis processing at the time of creation in the patch analysis unit 254 will be described.

Figures 4A, 4B, 4C, 4D:
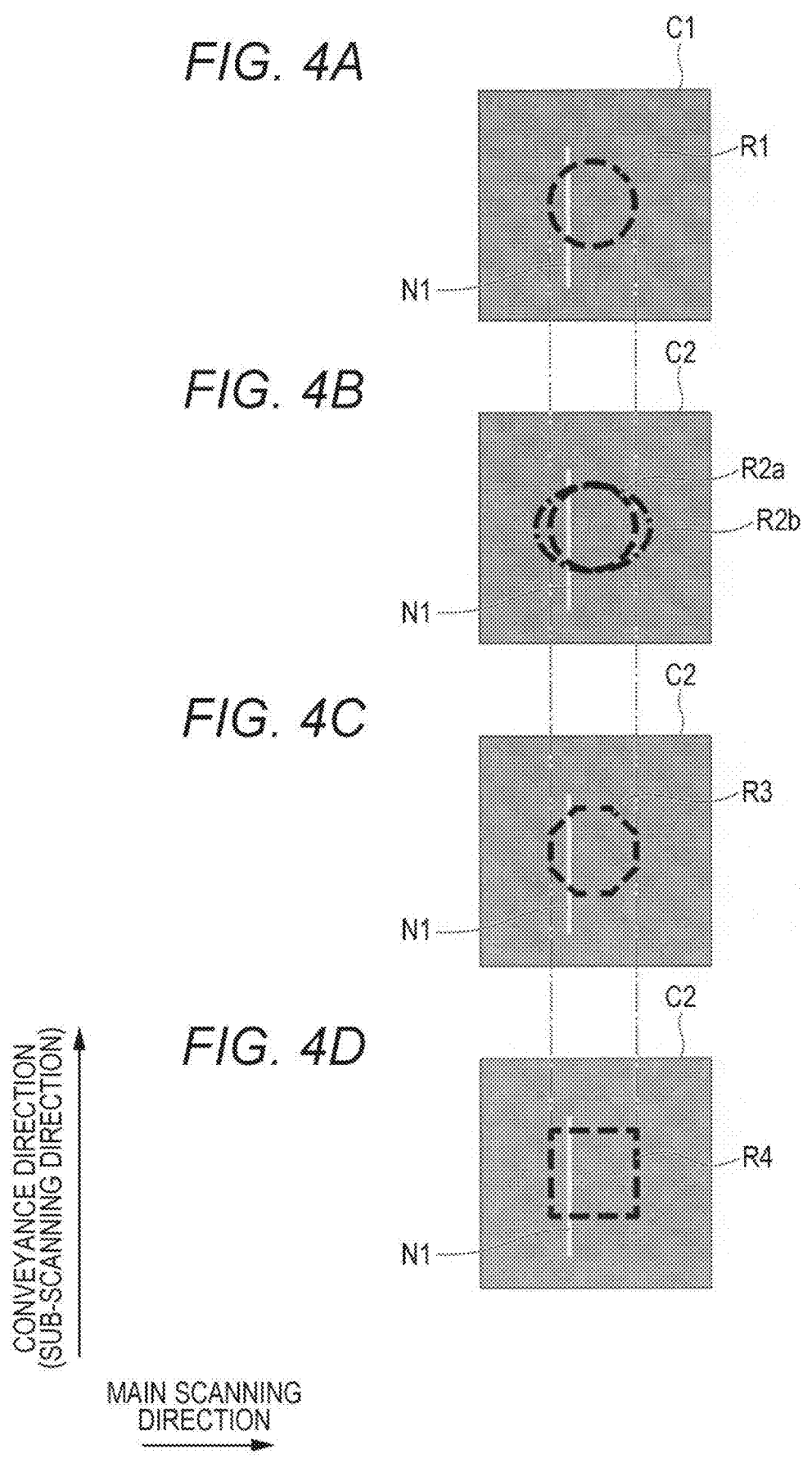

FIGS. 4A to 413 are diagrams for explaining the patch analysis processing at the time of creation in the creation mode of the color conversion table in the color conversion system 1 according to the present embodiment. A main scanning direction and a sub-scanning direction illustrated in FIGS. 4A to 4D are the same as the main scanning direction and the sub-scanning direction described with reference to FIG. 3, and thus redundant description will be omitted.

FIG. 4A illustrates the patch C1 cut into a size that allows the sheet to pass through the aperture of the colorimeter 40. In the patch C1, a region R1 covered by the aperture of the colorimeter 40, that is, a circular region having a diameter of 3 mm located at a center of the patch C1 drawn by a dotted line is illustrated. As illustrated in FIG. 4A, the region R1 includes a part of the streak N1. Therefore, when the patch C1 is measured by the colorimeter 40, an error occurs in a colorimetric value due to the influence of the streak N1. Note that, in FIGS. 4A to 4D, the streak N1 is illustrated for convenience of description, but originally, the streak N1 is not visible, FIGS. 4B to 4D are diagrams illustrating examples of regions of interest at the time of creation for a read image (patch C2) of the patch C1 set (analyzed) by the patch analysis unit 254 in a case where the operation mode for the color conversion table is the use mode. In the use mode of the color conversion table, since the patch analysis unit 254 disables the image noise removal processing, the streak N1 exists in the patch C2 illustrated in FIGS. 4B to 4D similarly to the patch C1 illustrated in FIG. 4A.

The patch analysis unit 254 sets the same region as the region R1 (see FIG. 4B) or substantially the same region as the region R1 (see FIGS. 4C and 4D) in the patch C2 as the region of interest at the time of creation, that is, a sampling region of the RGB value based on the information on the region covered by the aperture of the colorimeter 40, that is, the information on a position, shape, and area in the patch C1 of the region R1 illustrated in FIG. 4A. The patch analysis unit 254 sets a shape of the region of interest at the time of creation of the patch to the same shape as the shape of the region covered by the aperture of the colorimeter 40 or an arbitrary shape circumscribing the shape of the region covered by the aperture of the colorimeter. Note that the information regarding the position, shape, and area of the region R1 in the patch C1 is registered in the information processing unit 25 in advance.

FIG. 4B illustrates a region of interest R2*a* drawn by a dotted line and a region of interest R2*b* drawn by a one-dot chain line as regions of interest at the time of creation of the patch C2. The region of interest R2*a* is a region of interest at the time of creation analyzed by the patch analysis unit 254 in a case where resolutions in the main scanning direction and the sub-scanning direction of the scanner 24 are the same. The region of interest R2*b* is a region of interest at the time of creation analyzed by the patch analysis unit 254 in a case where the resolution in the main scanning direction of the scanner 24 is larger than the resolution in the sub-scanning direction.

In a case where the resolutions in the main scanning direction and the sub-scanning direction of the scanner 24 are the same, since the sampling speeds of the RGB values in the main scanning direction and the sub-scanning direction are the same, the patch analysis unit 254 analyzes and sets the region of interest R2*a*, which is the same region as the circular region having a diameter of 3 mm located at the center of the patch C1, as the region of interest at the time of creation. That is, in a case where the operation mode for the color conversion table is the creation mode, the patch analysis unit 254 sets the same region of interest as the region covered by the aperture of the colorimeter 40 as the region of interest at the time of creation of the patch based on the information of the region covered by the aperture of the colorimeter 40.

In a case where the resolutions in the main scanning direction and the sub-scanning direction of the scanner 24 are different, for example, in a case where the resolution in the main scanning direction of the scanner 24 is larger than the resolution in the sib-scanning direction, the sampling speed of the RGB values in the main scanning direction becomes faster than the sampling speed of the RGB values in the sub-scanning direction, and the number of sampling pixels in the ream scanning direction increases at the same time. Therefore, the region of interest at the time of creation analyzed by the patch analysis unit 254, that is, the region of interest R2*b*, is an elliptical region extending in the main scanning direction as compared with the region of interest R2*a*.

Note that, in order to correctly correspond the region of interest R2*a* illustrated in FIG. 413 to the region R1 covered by the aperture of the colorimeter 40, the patch analysis unit 254 sets the region of interest R2*a* in the same manner as the region R1. However, the present invention is not limited thereto. For example, for convenience of processing, the region of interest at the time of creation may be set to a polygonal or square region circumscribing the shape of the region R1. That is, in a case where the operation mode for the color conversion table is the creation mode, the patch analysis unit 254 may set a region of interest approximate to the region covered by the aperture of the colorimeter 40 as the region of interest at the time of creation of the patch based on the information of the region covered by the aperture of the colorimeter 40.

FIG. 4C is a diagram illustrating an image in which the region of interest at the time of creation of the patch C2 is set to a polygon. As illustrated in FIG. 4C, a region of interest R3 is set as an octagonal region located at the center of the patch C2. This octagon circumscribes the circle of the region R1.

FIG. 4D is a diagram illustrating an image in which the region of interest at the time of creation of the patch C2 is set to a square. As illustrated in FIG. 4D, a region of interest R4 is set as a square region located at the center of the patch C2. This square circumscribes the circle of the region R1.

As described above, in a case where the same region of interest as the region covered by the aperture of the colorimeter 40 is set as the region of interest at the time of creation, the patch analysis unit 254 sets the shape of the region of interest at the time of creation to the same shape as the shape of the region covered by the aperture of the colorimeter 40 (see FIG. 413), and in a case where the region of interest approximate to the region covered by the aperture of the colorimeter 40 is set as the region of interest at the time of creation, the patch analysis unit sets the shape of the region of interest at the time of creation to an arbitrary shape circumscribing the shape of the region covered by the aperture of the colorimeter 40 (See FIGS. 4C and 4D.).

Next, patch analysis processing at the time of use in the patch analysis unit 254 will be described.

Figures 5A, 5B:
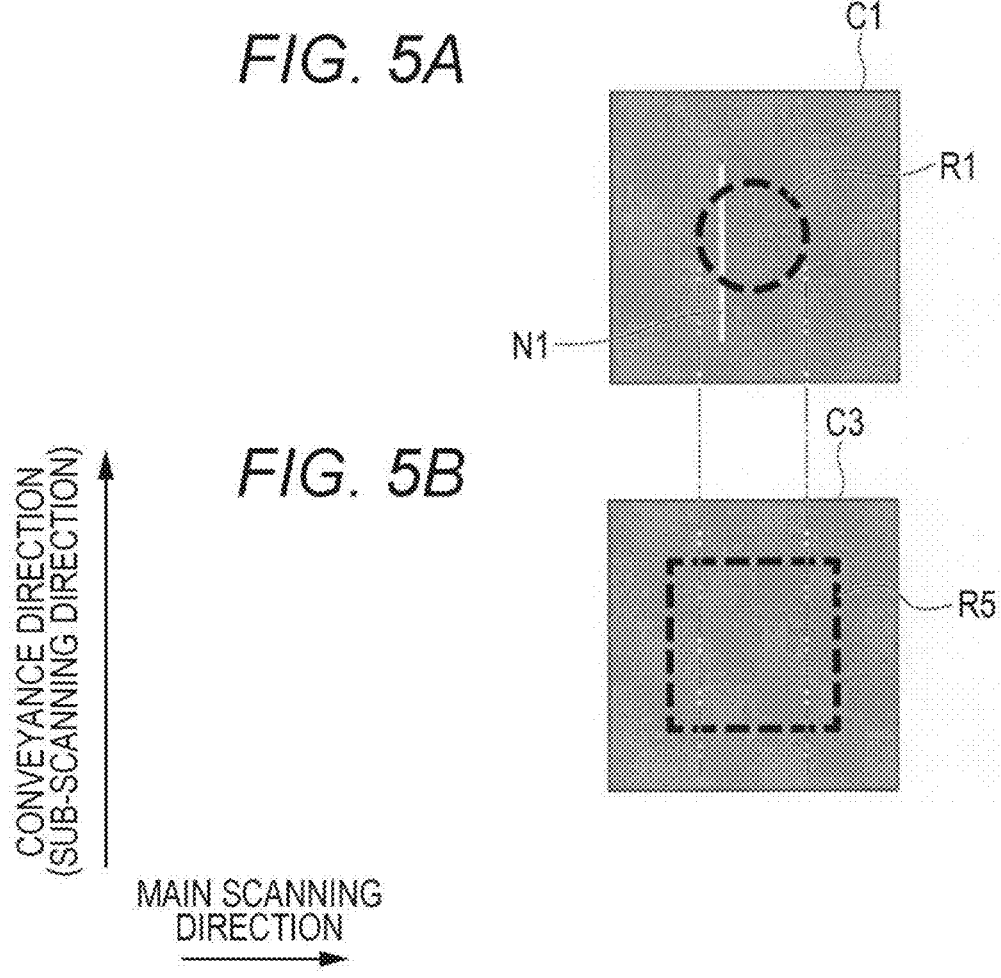
FIGS. 5A and 5B are diagrams for explaining patch analysis processing at the time of use in a use mode of a color conversion table in the color conversion system according to the embodiment of the present invention.

FIGS. 5A and 5B are diagrams for explaining the patch analysis processing at the time of use in the use mode of the color conversion table in the color conversion system 1 according to the present embodiment. Similarly to FIG. 4A, FIG. 5A illustrates the patch C1 cut into a size that allows the sheet to pass through the aperture of the colorimeter 40, and thus redundant description will be omitted.

FIG. 5B is a diagram illustrating a region of interest at the time of use set for each patch included in the test sheet by the patch analysis unit 254 in a case where the operation mode for the color conversion table is the use mode, that is, in a case where the scanner 24 is used as a colorimeter. A patch C3 illustrated in FIG. 5B is a read image obtained by the scanner 24 reading a patch included in a test sheet to be colorimetrically measured. The patch analysis unit 254 determines a region of interest R5 that is a region of interest at the time of use in the patch C3, that is, a sampling region of RGB values based on the information regarding the position, shape, and area of the region R1 in the patch C1 illustrated in FIG. 5A. At this time, a median filter is used to remove the streak N1 (image noise) included in the region R1.

In a case where the operation mode for the color conversion table is the use mode, the patch analysis unit 254 enables the image noise removal processing and analyzes the region of interest at the time of creation for the patch C3 from which the image noise has been removed. Therefore, the removed streak N1 does not exist in the patch C3. As illustrated in FIG. 5B, in the use mode of the color conversion table, the patch analysis unit 254 sets the region of interest at the time of use (region of interest R5) to be larger than the region of interest at the time of creation (regions of interest R2*a*, R2*b*, R3 and R4) illustrated in FIGS. 4B to 413. That is, in a case where the operation mode for the color conversion table is the use mode, the patch analysis unit 254 sets the region of interest larger than the region of interest at the time of creation as the region of interest at the time of use of the patch.

The number of pixels included in the region of interest at the time of use increases as the patch analysis unit 254 sets the region of interest at the time of use to be larger than the region of interest at the time of creation. Therefore, when the colorimetric value estimation unit 258 estimates the colorimetric value by averaging the number of pixels included in the region of interest at the time of use, it is possible to remove low-cycle noise (for example, color unevenness) in an image. That is, the patch analysis unit 254 sets the region of interest at the time of use to be larger than the region of interest at the time of creation, so that the colorimetric processing using the scanner 24 can reduce the influence of image noise and improve the colorimetric accuracy.

Furthermore, as illustrated in FIG. 5B, the shape of the region of interest R5 is different from the shape of the region R1. Since it is not necessary to set the region of interest R5 and the region R1 to correctly correspond to each other in the use mode of the color conversion table, the region of interest R5 may be set to an arbitrary shape.

[Procedure of Colorimetric Processing]

Figure 6:
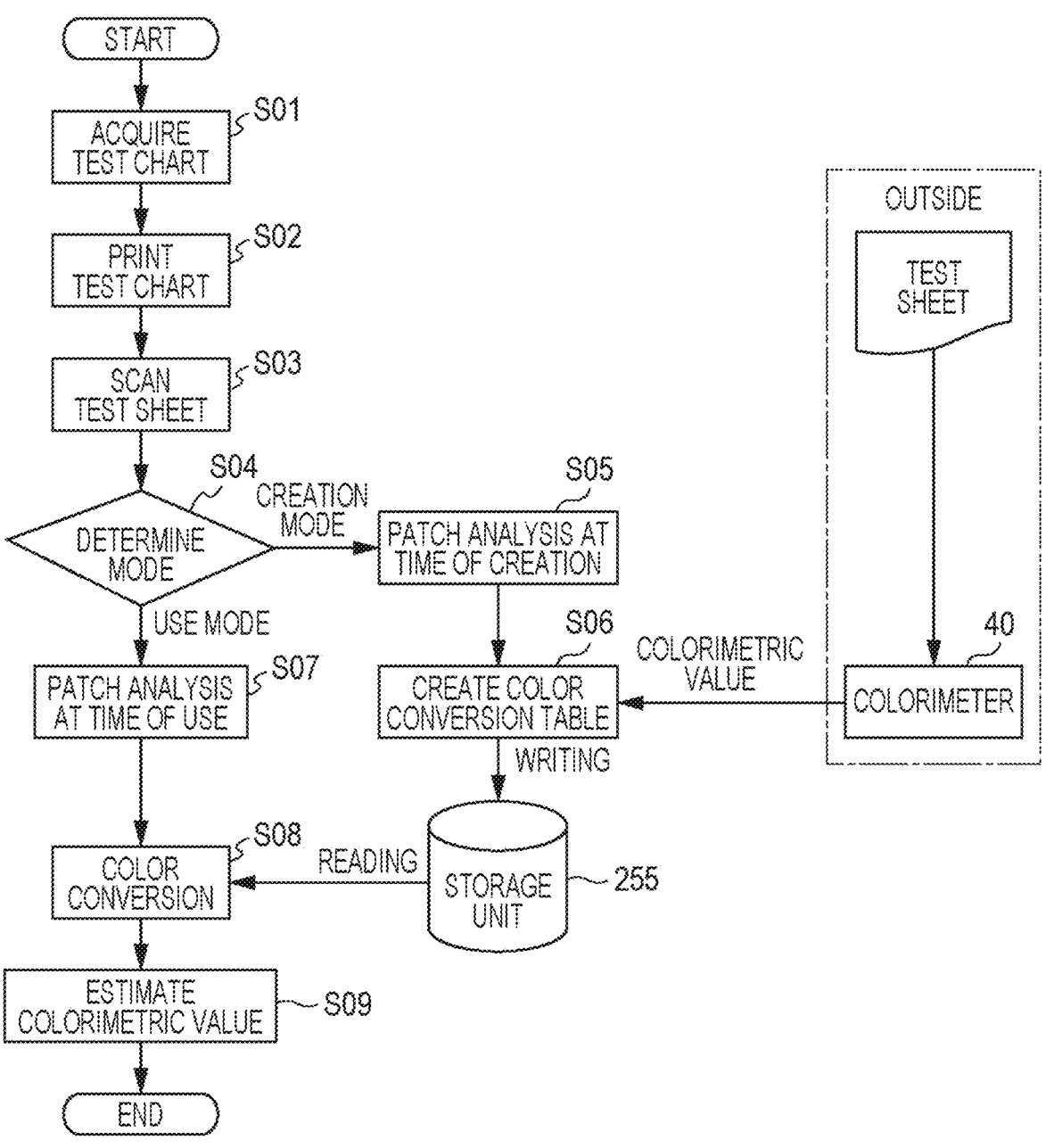
FIG. 6 is a flowchart illustrating a procedure of colorimetric processing in the color conversion system according to the embodiment of the present invention.

Next, colorimetric processing in the color conversion system 1 will be described. FIG. 6 is a flowchart illustrating a procedure of colorimetric processing in the color conversion system 1 according to the present embodiment. The processing described below starts when a test chart is generated in color adjustment processing that is pre-stage processing of the colorimetric processing. Note that a detailed description of the color adjustment processing will be omitted.

First, the printer 20 acquires a test chart generated in the color adjustment processing that is pre-stage processing (step S01).

Next, the printer 20 prints the test chart on a recording medium, and outputs the test sheet on which the test chart is printed to the scanner 24 (step S02).

Next, the scanner 24 scans the test sheet and outputs a read image of the test sheet to the information processing unit 25 (step S03).

Next, when acquiring the read image of the test sheet, the read image acquisition unit 252 of the information processing unit 25 outputs the read image of the test sheet to the patch analysis unit 254. The patch analysis unit 254 determines whether the mode instructed by the mode switching unit 253 is the creation mode of the color conversion table or the use mode of the color conversion table (step S04).

In the processing of step S04, when determining that the mode instructed by the mode switching unit 253 is the use mode of the color conversion table (step S04 is the use mode determination), the patch analysis unit 254 performs processing of step S07 described later.

On the other hand, in the processing of step S04, when determining that the mode instructed by the mode switching unit 253 is the creation mode of the color conversion table (step S04 is the creation mode determination), the patch analysis unit 254 disables the image noise removal processing and performs the patch analysis processing at the time of creation (step S05). In this processing, the patch analysis unit 254 analyzes the region of interest at the time of creation of each patch based on the region covered by the aperture of the colorimeter 40 (see the region R1 in FIGS. 4A to 4D) with respect to the read image (see the patch C2 in FIGS. 4A to 4D) of each patch included in the test sheet. Furthermore, the patch analysis unit 254 outputs the analyzed RGB values (Hereinafter, the RGB values of time test sheet are abbreviated.) of the region of interest at the time of creation of each patch to the color conversion table creation unit 255 of the information processing unit 25.

Next, the color conversion table creation unit 255 of the information processing unit 25 creates a color conversion table on the basis of the RGB values of the test sheet acquired from the patch analysis unit 254 and the colorimetric values of the test sheet acquired from the colorimeter 40 (step S06). Note that, outside the printer 20, each patch on the test sheet is colorimetrically measured by the colorimeter 40, and a colorimetric value is input to the color conversion table creation unit 255 via a USB connection port, a LAN, or the like. Furthermore, the color conversion table creation unit 255 outputs the created color conversion table to the storage unit 256 of the information processing unit 25. The storage unit 256 stores the color conversion table created by the color conversion table creation unit 255.

Here, the description returns to the processing of step S04. In a case where the mode instructed by the mode switching unit 253 is determined to be the use mode in the processing of step S04, the patch analysis unit 254 enables the image noise removal processing and performs the patch analysis processing at the time of use (step S07). In this processing, the patch analysis unit 254 performs image noise removal processing on the read image of each patch included in the test sheet to be colorimetrically measured. Furthermore, the patch analysis unit 254 determines the region of interest at the time of use of each patch based on the region covered by the aperture of the colorimeter 40 (see the region R1 in FIGS. 4A to 4D) with respect to the read image (see the patch C3 in FIGS. 5A and 5B) of each patch included in the test sheet from which the image noise has been removed. Furthermore, the patch analysis unit 254 outputs the analyzed RGB values of the region of interest at the time of use of each patch to the color conversion unit 257.

Next, the color conversion unit 257 converts the RUB values of the read image of the test sheet to be colorimetrically measured into pixel values in the Lab color space (step S08). In this processing, the color conversion unit 257 acquires the RGB values of the region of interest at the time of use of each patch of the test sheet to be colorimetrically measured from the patch analysis unit 254. Furthermore, the color conversion unit 257 acquires the color conversion table from the storage unit 256, and converts the RGB value of the region of interest at the time of use of each patch into the pixel value in the Lab color space on the basis of the color conversion table. Furthermore, the color conversion unit 257 outputs the pixel value in the Lab color space of each converted patch to the colorimetric value estimation unit 258.

Next, the colorimetric value estimation unit 258 estimates the colorimetric value of each patch included in the test sheet to be colorimetrically measured (step S09). In this processing, the colorimetric value estimation unit 258 acquires the pixel value in the Lab color space of each patch included in the test sheet to be colorimetrically measured, converted by the color conversion unit 257. Furthermore, the colorimetric value estimation unit 258 averages pixel values included in the region of interest at the time of use for each patch, and estimates the average value as a colorimetric value of each patch. After the processing of step S09, the colorimetric processing ends.

Effects

As described above, in the analysis processing at the time of creation, the patch analysis unit 254 of the color conversion system 1 according to the present embodiment disables the image noise removal processing on the read image (patch C2) of each patch included in the test sheet. Therefore, in a case where image noise is present in the patch of the test sheet, the same image noise is present in both the patch (patch C1) of the test sheet subjected to colorimetry by the colorimeter 40 and the read image (patch C2) of the patch included in the test sheet. Furthermore, the patch analysis unit 254 sets the region of interest (region of interest at the time of creation) of the read image (patch C2) of the patch included in the test sheet to correctly correspond to the region (region R1) covered by the aperture of the colorimeter 40 in the analysis processing at the time of creation. As described above, the accuracy of the color conversion table created from the patch colorimetrically measured by the colorimeter 40 and the patch read by the scanner 24 in which the same image noise exists at the same position is higher than the accuracy of the color conversion table created in a case where the image noise exists only in the patch colorimetrically measured by the colorimeter 40. That is, by the patch analysis unit 254 disabling the image noise removal processing in the use mode of the color conversion table, the influence of the image noise can be reduced and the accuracy of the color conversion table can be improved, and as a result, the accuracy of the colorimetric processing using the color conversion table can also be improved.

Furthermore, in the analysis processing at the time of use, the patch analysis unit 254 enables the image noise removal processing for the read image (patch C3) of each patch included in the test sheet to be colorimetrically measured. Therefore, when estimating a colorimetric value of the test sheet to be colorimetrically measured, the patch analysis unit is not affected by the image noise. Furthermore, in the analysis processing at the time of use, the patch analysis unit 254 sets the region of interest (region of interest at the time of use) of the read image (patch C3) of each patch included in the test sheet to be colorimetrically measured to be larger than the region of interest (region of interest at the time of creation) of the read image (patch C2) of the patch included in the test sheet in the analysis processing at the time of creation. Therefore, when the colorimetric value of the test sheet to be colorimetrically measured is estimated, the number of pixels (the number of pixels included in the region of interest at the time of use) of the read image of the sampled test sheet increases, and when the colorimetric value estimation unit 258 estimates the colorimetric value by averaging the number of pixels included in the region of interest at the time of use, it is possible to remove low-cycle noise in the image and perform colorimetry with high accuracy.

As described above, according to the color conversion system 1 according to the present embodiment, it is possible to reduce the influence of image noise and perform colorimetry with high accuracy in the colorimetric processing using the scantier.

Note that the present invention is not limited to the above-described embodiments, and it goes without saying that various other application examples and modification examples can be taken without departing from the gist of the present invention described in the claims.

For example, the above-described embodiments describe the configuration of the color conversion system in detail and specifically in order to describe the present invention in an easy-to-understand manner, and are not necessarily limited to those having all the described configurations. Furthermore, a part of the configuration of the embodiment described here can be replaced with the configuration of another embodiment, and further, the configuration of another embodiment can be added to the configuration of an embodiment. Furthermore, it is also possible to add, delete, and replace other configurations for a part of the configuration of each embodiment.

Furthermore, the control lines and the information lines indicate what is considered to be necessary for the description, and do not necessarily indicate all the control lines and the information lines on the product. In practice, it may be considered that almost all the configurations are connected to each other.

Furthermore, in the color conversion system 1 according to the above-described embodiment, an example has been described in which the sizes of the patches included in the test sheet used in each of the creation mode and the use mode of the color conversion table are the same, but the present invention is not limited thereto. For example, the size of the patch included in the test sheet used in the use mode of the color conversion table may be increased. In this way, in the use mode of the color conversion table, since the region of interest at the time of use of the patch included in the test sheet can be set to be larger, the effect of removing the low-cycle noise in the image can be improved, and the accuracy of the colorimetry can be further improved.

Furthermore, in the color conversion system 1 according to the above-described embodiment, an example has been described in which test sheets (see FIG. 3) generated with the same color pattern are used in each of the creation mode and the use mode of the color conversion table, but the present invention is not limited thereto. Normally, the test chart used in the mode of creating the color conversion table includes representative colors of about 1000 colors. Note that, in a case where it is not necessary to include a representative color of about 1000 colors at the time of using a color conversion table such as color verification, a test sheet generated with a color pattern having a smaller number of colors may be used. For example, the color pattern of the Japan Color Control Strip 54 color may be applied to the test sheet used in the use mode of the color conversion table. In this way, since the number of patches included in the test sheet used in the use mode of the color conversion table is reduced from about 1000 to 54, the work load and the work time at the time of using the color conversion table such as color verification can be greatly reduced.

Furthermore, the color conversion table may be held in a cloud server with which the printer 20 can communicate via the Internet. Then, the information processing unit 25 may access the cloud server to read the color conversion table and estimate the colorimetric value when executing the function related to the colorimetric processing.

Although embodiments of the present invention have been described and illustrated in detail, the disclosed embodiments are made for purposes of illustration and example only and not limitation. The scope of the present invention should be interpreted by terms of the appended claims.

What is claimed is:

1. A color conversion system comprising:
an image reader; and
a hardware processor that executes processes comprising:
receiving a read image read by the image reader, the read image being an image of a test sheet having a plurality of patches formed thereon;
determining an operation mode for a color conversion table in which a read pixel value and a pixel value in a color space are associated with each other for each of the patches;
analyzing, in the read image, a region of interest for each of the patches of the read image according to the operation mode; and
performing image noise removal processing,
wherein, in a case where the operation mode is a use mode, the hardware processor performs color conversion by converting a read pixel value corresponding to the region of interest in the read image into a pixel value in the color space using the color conversion table.

2. The color conversion system according to claim 1, further comprising:
a colorimeter that measures a colorimetric value of the test sheet as a pixel value in the color space,
wherein, in a case where the operation mode is a creation mode, the hardware processor creates the color conversion table based on the read pixel value of the analyzed region of interest of the patch and the colorimetric value of the patch measured from the test sheet by the colorimeter.

3. The color conversion system according to claim 2, wherein the hardware processor disables the image noise removal processing in the case where the operation mode is the creation mode, and enables the image noise removal processing in the case where the operation mode is the use mode.

4. The color conversion system according to claim 3, wherein, in the case where the operation mode is the creation mode, the hardware processor sets the region of interest to be same as or approximate to a region covered by an aperture of the colorimeter as a region of interest at a time of creation of the patch, based on information on the region covered by the aperture of the colorimeter, and creates the color conversion table based on the set region of interest at the time of creation of the patch.

5. The color conversion system according to claim 4, wherein, in the case where the operation mode is the use mode, the hardware processor sets the region of interest larger than the region of interest at the time of creation of the patch as a region of interest at a time of use of the patch.

6. The color conversion system according to claim 4, wherein:

in a case where the hardware processor sets the region of interest to be same as the region covered by the aperture of the colorimeter as the region of interest at the time of creation, the hardware processor sets a shape of the region of interest at the time of creation to a shape same as a shape of the region covered by the aperture of the colorimeter, and in a case where the hardware processor sets the region of interest to be approximate to the region covered by the aperture of the colorimeter as the region of interest at the time of creation, the hardware processor sets the shape of the region of interest at the time of creation to an arbitrary shape circumscribing the shape of the region covered by the aperture of the colorimeter.

7. The color conversion system according to claim 4, wherein the information on the region covered by the aperture of the colorimeter includes information on a position, a shape, and an area of the region.

8. The color conversion system according to claim 1, wherein the image noise removal processing is processing of removing image noise including streaks, dirt, and chips.

9. The color conversion system according to claim 8, wherein the image noise removal processing includes a median filter used to remove noise from an image, morphology processing used to remove isolated points and connect and fill discontinuous points, and upper and lower point deletion processing of deleting upper and lower pixels exceeding a predetermined range to approximate an average value of pixel values.

10. The color conversion system according to claim 1, wherein the hardware processor estimates a colorimetric value using a pixel value in a color space of the patch having been color-converted.

11. A color conversion method comprising:

acquiring a read image read by an image reader, the read image being an image of a test sheet having a plurality of patches formed thereon;

acquiring a colorimetric value of the test sheet;

determining an operation mode for a color conversion table in which a read pixel value and a pixel value in a color space are associated with each other for each of the patches;

analyzing, in the read image, a region of interest for each of the patches of the read image according to the operation mode; and performing image noise removal processing, wherein, in a case where the operation mode is a use mode, the method comprises performing color conversion by converting a read pixel value corresponding to the region of interest in the read image into a pixel value in the color space using the color conversion table.

12. An information processing apparatus comprising a hardware processor that executes processes comprising:

acquiring a read image read by an image reader, the read image being an image of a test sheet having a plurality of patches formed thereon;

acquiring a colorimetric value of the test sheet;

analyzing, in the read image, a region of interest for each of the patches of the read image according to the operation mode; and performing image noise removal processing, wherein, in a case where the operation mode is a use mode, the hardware processor performs color conversion of converting the read pixel value corresponding to the region of interest of the patch into a pixel value in the color space using the color conversion table in a case where the operation mode is a use mode.

* * * * *